US011374400B2

(12) United States Patent
Gajanayake et al.

(10) Patent No.: US 11,374,400 B2
(45) Date of Patent: Jun. 28, 2022

(54) TOPOLOGY OF A SOLID STATE POWER CONTROLLER WITH TWO MID-CAPACITORS

(71) Applicants: Rolls-Royce North American Technologies, Inc., Indianapolis, IN (US); Rolls-Royce Singapore Pte. Ltd., Singapore (SG)

(72) Inventors: Chandana Jayampathi Gajanayake, Singapore (SG); David Loder, Carmel, IN (US); Yu Yang, Singapore (SG); Amit Kumar Gupta, Singapore (SG)

(73) Assignees: ROLLS-ROYCE SINGAPORE PTE. LTD., Singapore (SG); ROLLS-ROYCE NORTH AMERICAN TECHNOLOGIES, INC., Indianapolis, IN (US)

( * ) Notice: Subject to any disclaimer, the term of this patent is extended or adjusted under 35 U.S.C. 154(b) by 76 days.

(21) Appl. No.: 17/108,964

(22) Filed: Dec. 1, 2020

(65) Prior Publication Data
US 2022/0173588 A1 Jun. 2, 2022

(51) Int. Cl.
*H02H 7/26* (2006.01)
*H02H 7/12* (2006.01)
*H02H 1/04* (2006.01)

(52) U.S. Cl.
CPC ............ *H02H 7/268* (2013.01); *H02H 1/043* (2013.01); *H02H 7/12* (2013.01)

(58) Field of Classification Search
CPC ........... H02H 7/268; H02H 1/043; H02H 7/12
USPC .......................................................... 363/50
See application file for complete search history.

(56) References Cited

U.S. PATENT DOCUMENTS

| 5,132,895 | A | 7/1992 | Kase |
| 5,729,163 | A | 3/1998 | McCleary et al. |
| 6,429,632 | B1 | 8/2002 | Forbes et al. |
| 6,559,689 | B1 | 5/2003 | Clark |
| 8,519,686 | B2 | 8/2013 | Rozman et al. |
| 8,536,730 | B2 | 9/2013 | Rozman et al. |
| 8,598,854 | B2 | 12/2013 | Soenen et al. |
| 8,625,243 | B2 | 1/2014 | Rozman et al. |
| 8,716,997 | B2 | 5/2014 | Rao et al. |
| 8,817,501 | B1 | 8/2014 | Low et al. |

(Continued)

FOREIGN PATENT DOCUMENTS

| CN | 1479427 A | 3/2004 |
| EP | 0600751 A2 | 6/1994 |

*Primary Examiner* — Yemane Mehari
(74) *Attorney, Agent, or Firm* — Shumaker & Sieffert, P.A.

(57) ABSTRACT

A bi-directional direct current (DC) solid state power controller (SSPC) architecture and control method. The SSPC protects a DC distribution system by isolating both the positive and negative buses independently in case of short circuit or ground fault. The SSPC architecture includes two self-heal interleaved capacitors and includes a fast, soft-charging control technique that provides line-isolated charging of the DC bulk capacitor to avoid inrush current when powering up the DC distribution system. The soft-charging function alternately charges one of the two interleaved capacitors, while the other capacitor discharges to the DC bulk capacitor. Repetitive switching results in a charging and discharging process that increases the voltage of the DC bulk capacitor prior to powering up the DC distribution system, while keeping the DC power source isolated from the load.

20 Claims, 7 Drawing Sheets

(56) References Cited

U.S. PATENT DOCUMENTS

| | | | |
|---|---|---|---|
| 9,197,056 B2 | 11/2015 | Liu et al. | |
| 9,887,694 B2 | 2/2018 | Greither | |
| 9,931,947 B2 | 4/2018 | Roessler | |
| 10,027,223 B1 | 7/2018 | Zhang et al. | |
| 10,693,367 B1* | 6/2020 | Chatterjee | H02M 1/36 |
| 2007/0183174 A1* | 8/2007 | Lee | H03K 17/6871 |
| | | | 363/111 |
| 2007/0216425 A1 | 9/2007 | Okamura et al. | |
| 2009/0121781 A1 | 5/2009 | Oyama et al. | |
| 2011/0241766 A1 | 10/2011 | Zhang et al. | |
| 2012/0001683 A1 | 1/2012 | Wang | |
| 2015/0207401 A1 | 7/2015 | Zhang et al. | |
| 2015/0288278 A1 | 10/2015 | Shao | |
| 2017/0126120 A1 | 5/2017 | Chakraborty et al. | |
| 2017/0353105 A1 | 12/2017 | Solie et al. | |
| 2019/0312514 A1 | 10/2019 | Hukel | |

* cited by examiner

TOPOLOGY OF A SOLID STATE POWER CONTROLLER WITH TWO MID-CAPACITORS

TECHNICAL FIELD

The disclosure relates power converters, and specifically to bi-directional direct current solid state power controllers.

BACKGROUND

Direct current (DC) power distribution is in aerospace and marine industries. Various types of solid state power controllers (SSPC) may provide power control and protection for DC power distribution. Some examples of SSPC may protect the DC distribution system in case of short circuit or ground fault. Some examples of SSPC may also include a soft-charging process to help avoid inrush current, for example, during start-up of a DC distribution system.

SUMMARY

In general, the disclosure describes bi-directional direct current (DC) solid state power controller (SSPC) architecture and control method. The SSPC protects a power distribution system, e.g. a DC power distribution system, by isolating both the positive and negative buses independently in case of short circuit or ground fault. The SSPC architecture includes two self-healing interleaved capacitors and operates with a soft-charging control technique that provides line-isolated charging of the bulk capacitor to avoid inrush current when powering up the distribution system. The soft-charging function alternately charges one of the two interleaved capacitors, while the other capacitor discharges to the bulk capacitor. Repetitive switching results in a charging and discharging process that increases the voltage of the bulk capacitor prior to powering up the distribution system, while keeping the power source isolated from the load.

In one example, this disclosure describes an circuit comprising a differential bus including a high-side rail and a low-side rail; a bulk capacitor coupled between the high-side rail and the low-side rail, the bulk capacitor configured to filter the power output by the circuit; and a pre-charging circuit configured to pre-charge the bulk capacitor, the pre-charging circuit includes a first switch and a second switch; a first middle capacitor and a second middle capacitor; wherein a drain terminal of the first switch is directly coupled to a first terminal of the second middle capacitor and a source terminal of the first switch is directly coupled to a first terminal of the first capacitor; wherein a drain terminal of the second switch is directly coupled to a second terminal of the second capacitor and the source terminal of the second switch is directly coupled to a second terminal of the first capacitor.

In another example, this disclosure describes a method for controlling a pre-charging circuit coupled between a power source and a differential bus includes activating and deactivating a first switch and a second switch during a first time period to transfer energy from the power source to a first middle capacitor and isolate the first middle capacitor from a bulk capacitor, wherein: the pre-charging circuit comprises the first switch and the second switch, the differential bus comprises a high-side rail and a low-side rail, and the bulk capacitor is coupled between the high-side rail and the low-side rail; activating and deactivating the first switch and the second switch during a second time period to transfer energy from the first middle capacitor to the bulk capacitor and isolate the first middle capacitor the power source; activating and deactivating the first switch and the second switch during the second time period to transfer energy from the power source to the second middle capacitor and isolate the second middle capacitor from the bulk capacitor; and activating and deactivating the first switch and the second switch during the first time period to transfer energy from the second middle capacitor to the bulk capacitor and isolate the second middle capacitor from the power source.

In another example, this disclosure describes a device comprising a non-transitory computer-readable medium having executable instructions stored thereon, configured to be executable by processing circuitry for causing the processing circuitry to: activate and deactivate a first switch and a second switch during a first time period to transfer energy from the power source to a first middle capacitor and isolate the first middle capacitor from a bulk capacitor. The pre-charging circuit comprises the first switch and the second switch, the differential bus comprises a high-side rail and a low-side rail, and the bulk capacitor is coupled between the high-side rail and the low-side rail. The instructions further cause the processing circuitry to activate and deactivate the first switch and the second switch during a second time period to transfer energy from the first middle capacitor to the bulk capacitor and isolate the first middle capacitor from the power source; activate and deactivate the first switch and the second switch during the second time period to transfer energy from the power source to the second middle capacitor and isolate the second middle capacitor from the bulk capacitor; and activate and deactivate the first switch and the second switch during the first time period to transfer energy from the second middle capacitor to the bulk capacitor and isolate the second middle capacitor from the power source.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes devices and techniques for using an isolation circuit configured to connect and disconnect a power source and a load. The isolation circuit, which may also be referred to as a pre-charging circuit, can also be used for pre-charging a bulk capacitor coupled between a high-side rail and a low-side rail of a differential bus of an electrical power system (e.g., a direct current—DC—electrical power system). The pre-charging techniques may maintain the inrush current to the bulk capacitor within a range that may prevent or reduce damage to the components of the electrical power system. The pre-charging circuit may include two middle capacitors as well as switches to control the current flow to and from the capacitors. Processing circuitry may control the operation of the pre-charging circuit to deliver electrical power to the bulk capacitor during startup (or, in other words, initial powering up) of the electrical power system.

The pre-charging techniques of this disclosure include transferring energy from a power source to a differential bus by storing smaller amounts of energy on the two middle capacitors coupled between the power source and the differential bus. The pre-charging techniques may include a repetitive charging and discharging of the middle capacitors that results in slowly increasing the voltage of the bulk capacitor without causing a large magnitude inrush current. A controller may transfer energy from a power source to one of the middle capacitors and concurrently isolate that middle capacitor from the bulk capacitor. The controller may then isolate that middle capacitor from the power source allowing the middle capacitor to transfer energy to the bulk capacitor.

Although this disclosure describes the use of a circuit for pre-charging, the circuit topology can be used for other purposes and does not have to be used for pre-charging an electrical power system. For example, the pre-charging circuit can connect and disconnect a power source and a load or converter. A controller can also use the pre-charging circuit topology for detecting issues in a bulk capacitor, for detecting reverse polarity issues, and for controlling systems with multiple power sources.

Figure 1:
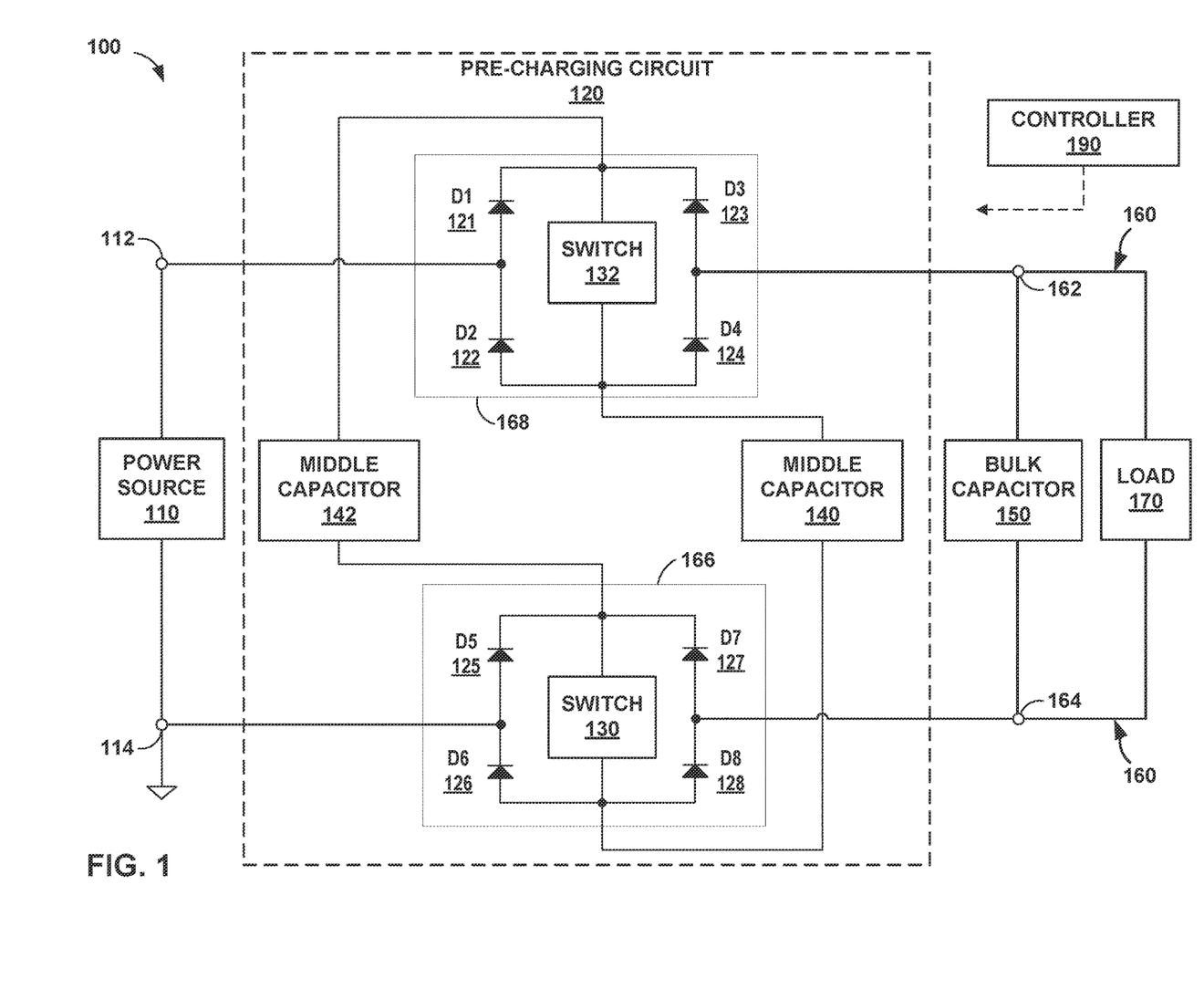
FIG. 1 is a block diagram illustrating a system that includes a pre-charging circuit coupled between a power source and a differential bus, in accordance with one or more techniques of this disclosure.

FIG. 1 is a block diagram illustrating a system that includes a pre-charging circuit coupled between a power source and a differential bus, in accordance with one or more techniques of this disclosure. System 100 is an electrical power system illustrating one example of a solid state power converter (SSPC) that may isolate and protect a power distribution system.

In the example of FIG. 1, system 100 includes power source 110, pre-charging circuit 120, bulk capacitor 150, differential bus 160 with high-side rail 162 and low-side rail 164, load 170, and controller 190. FIG. 1 shows just one example of electrical power system 100, and many other examples of electrical power system 100 may exist. For instance, in some examples, electrical power system 100 may be configured to operate in a reverse direction, where electrical power system 100 includes a power source coupled to the differential bus and a load coupled to input terminals 112 and 114. In other examples, electrical power system 100 is a bi-directional system where both power source 110 and load 170 can operate as a power source and/or an electrical load.

Power source 110 may be configured to generate electrical power. Power source 110 can include an electric generator that converts mechanical power derived from a shaft, rotor, and/or other mechanical component to electrical power for use by other components or circuits of electrical power system 100. In some examples, the electric generator may also be mounted to a mechanical distribution system and/or a mechanical transmission system (not shown in FIG. 1). In some examples, electrical power system 100 may include one or more additional power sources, also not shown in FIG. 1. Power source 110 can include an AC generator such as an induction generator or a DC generator that produces DC electricity, or other DC power source, such as a battery. Power source 110 may include a wound field machine, a Halbach array generator with permanent magnets on a rotor that is driven by an engine shaft or a propulsor shaft, or any other type of generator. In examples in which source 110 is a DC power source, terminal 112 may be a positive terminal and terminal 114 may be a negative terminal.

Load 170 may include various types of electrical machines, lighting, pumps, and so on. In some examples, load 170 may include a power converter. That is, load 170 may be configured to convert the power received from power source 110 to another form of electricity for another portion of electrical load 170 (not shown in FIG. 1). For example, converter 170 may include an inverter configured to convert DC electricity received by converter 170 to AC electricity for an electric motor. In other examples, a power converter of load 170 may convert DC power at a first voltage to DC power at a higher or lower voltage. In some examples, load 170 may take electricity directly from differential bus 160 of power system 100 without a converter.

Differential bus 160 includes high-side rail 162 and low-side rail 164. Differential bus 160 may operate as a DC bus, where the voltage levels on each of rails 162 and 164 are DC values during normal operation. Although FIG. 1 depicts differential bus 160 as a two-level bus, differential bus 160 may also be a three-level bus with a third rail connected to a reference voltage (e.g., a middle rail connected to reference ground). In this disclosure, power source 110 will be described as separated from differential bus 160 by pre-charging circuit 120. After start-up, when power source 110 is fully connected via pre-charging circuit 120, terminals 112 and 114 may be considered part of differential bus 160.

During a startup mode of electrical power system 100, the voltage level across differential bus 160 may be much lower than the target voltage level. The target voltage level may be tens or hundreds of volts, such as 28 volts, 270 volts, 540 volts, or 750 volts in some examples. The voltage level across differential bus 160 may also be much lower than the voltage generated by power source 110. To gradually increase the voltage level across differential bus 160 during start-up, e.g., to prevent a high magnitude of inrush current, controller 190 can control pre-charging circuit 120 to gradually transfer energy from power source 110 to differential bus 160.

Bulk capacitor 150 may be coupled between high-side rail 162 and low-side rail 164. A first terminal of bulk capacitor 150 may be coupled to high side rail 162 and a second terminal of bulk capacitor 150 may be coupled to low side rail 164. Bulk capacitor 150 may be configured to filter the power generated by power source 110 that differential bus 160 receives from pre-charging circuit 120. Bulk capacitor 150 can act as a low-pass filter for the energy transferred from power source 110 to differential bus 160. Bulk capacitor 150 can filter ripple generated by power source 110 or by load 170 by preventing ripple currents and smoothing out variations in the voltage across differential bus 160. In some examples, the capacitance of bulk capacitor 150 may be in a range between two hundred microfarads and five millifarads or in a range between one hundred microfarads and ten millifarads. In some examples, the capacitance of bulk capacitor 150 may be as high as one hundred millifarads. In this disclosure, bulk capacitor 150, e.g. $C_{BULK}$, may also be referred to as load capacitor 150, e.g. $C_{LOAD}$.

Controller 190 may be configured to control the operation of power source 110, pre-charging circuit 120, and/or load 170. For example, controller 190 can control the operation of load 170 by delivering control signals to one or more switches that may be included in load 170. Controller 190 may also be able to activate or deactivate power source 110 or otherwise control a mode of operation of power source 110 to deliver different levels and/or types of power.

Controller 190 is processing circuitry that may include any suitable arrangement of hardware, software, firmware, or any combination thereof, to perform the techniques attributed to controller 190 herein. Examples of controller 190 include any one or more microprocessors, digital signal processors (DSPs), application specific integrated circuits (ASICs), full authority digital engine control (FADEC) units, engine control units (ECUs), field programmable gate arrays (FPGAs), or any other equivalent integrated or discrete logic circuitry, as well as any combinations of such components. Accordingly, the terms "processing circuitry," "processor" or "controller," as used herein, may refer to any one or more of the foregoing structures or any other structure operable to perform techniques described herein.

When controller 190 includes software or firmware, controller 190 further includes any hardware for storing and executing the software or firmware, such as one or more processors or processing units. In examples in which electrical power system 100 is mounted on a vehicle, controller 190 may be implemented by a FADEC unit.

In general, a processing circuitry may include one or more microprocessors, DSPs, ASICs, FPGAs, or any other equivalent integrated or discrete logic circuitry, as well as any combinations of such components. Although not shown in FIG. 1, controller 190 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 190 (e.g., may be external to a package in which controller 190 is housed).

During a startup mode of electrical power system 100, the voltage across power source 110 may be much larger than the voltage across rails 162 and 164. In the startup mode, bulk capacitor 150 be in an uncharged state. If directly connected to power source 110 in an uncharged state, a high magnitude inrush current may flow from node 112 to high-side rail 162, through bulk capacitor 150, and back through low-side rail 164 to node 114. In examples in which bulk capacitor 150 is uncharged and directly exposed to power source 110, the inrush current can be much larger than the nominal current rating of the components of pre-charging circuit 120 and/or bulk capacitor 150. In an example in which there is a fault in system 100, such as a fault in load 170, bulk capacitor 150, or some other component, the current through differential bus 160 may also be a high magnitude. A large inrush current or fault current may cause damage to bulk capacitor 150 and the other components of electrical power system 100. Therefore system 100 may be configured to pre-charge bulk capacitor 150 using pre-charging circuit 120.

Pre-charging circuitry 120, in the example of FIG. 1, includes switch 132, switch 130, middle capacitor 140 and middle capacitor 142. Switches 130 and 132 may be implemented as any type of switch, such as bipolar junction transistors (BJT), insulated gate bipolar transistors (IGBT) or other types of switches. In the example in which switch 130 and switch 132 are field effect transistors, e.g. metal oxide semiconductor field effect transistors (MOSFET), a drain terminal of switch 132 is directly coupled to a first terminal of middle capacitor 142 and a source terminal of switch 132 is directly coupled to a first terminal of middle capacitor 140. Similarly, a drain terminal of switch 130 is directly coupled to a second terminal of middle capacitor 142 and a source terminal of switch 130 is directly coupled to a second terminal of middle capacitor 140.

Pre-charging circuit 120 also includes plurality of diodes. An anode of diode D1 121 and a cathode of diode D2 122 connect to a first terminal 112 of power source 110. An anode of diode D3 123 and a cathode of diode D4 124 connect to high-side rail 162 of differential bus 160. An anode of diode D5 125 and a cathode of diode D6 126 connect to a second terminal 114 of power source 110. An anode of diode D7 127 and a cathode of diode D8 128 connect to low-side rail 164.

The cathodes of D1 121 and D3 123 connect to the first terminal of middle capacitor 2 142, and therefore also to the drain of switch 132. The anodes of D2 122 and D4 124 connect to the first terminal of middle capacitor 140 and therefore also to the source of switch 132. The cathodes of D5 125 and D7 127 connect to the second terminal of middle capacitor 142, and therefore also to the drain of switch 130. The anodes of D6 126 and D8 128 connect to the second terminal of middle capacitor 140 and therefore also to the source of switch 130. In this disclosure the assembly that includes switch 132, D1 121, D2 122, D3 123 and D4 124 may be referred to as power electronics switch 168. Similarly, the assembly that includes switch 130, D5 125, D 126, D7 127 and D8 128 may be referred to as power electronics switch 166.

Described another way, power electronics switches 168 and 166 are bidirectional current capable switch assemblies with a diode bridge and an active device, e.g., switches 130 and 132. Power electronics switch 168 may be sufficient for isolating or connecting the power source 110 to load 170. As described above load 170 may include a converter system. Power electronics switch 166 on low-side bus 164 may help to isolate the system in case of earth fault in the main DC bus, e.g., within load 170. The location of power electronics switch 166 on low-side bus 164 may provide additional safety and control advantages over an SSPC without a low-side bus switch. In some examples, low-side bus 164 may also be referred to as negative bus 164.

In operation, controller 190 may operate switches 130 and 132 to alternately charge and discharge the interleaved middle capacitors, middle capacitor 140 and middle capacitor 142 to pre-charge bulk capacitor 150. For example, controller 190 may disconnect power source 110 from the bulk capacitor 150 when charging middle capacitor 140. When bulk capacitor 150 is charging from middle capacitor 140, controller 190 may disconnect the load bus, e.g., high-side bus 162 from power source 110. In this manner, controller 190 may limit pulsed energy which may be discharged to the downstream converters or components of load 170. Also, if there is a short circuit in downstream circuitry, disconnecting high-side bus 162 while bulk capacitor 150 is receiving current from middle capacitor 140 may reduce the risk of severe damage to the downstream components of load 170.

Using the two interleaved middle capacitors, middle capacitor 140 and middle capacitor 142, power electronics switch 166 and power electronics switch 168, may provide a faster charge time for bulk capacitor 150, than using a single middle capacitor pre-charging circuit. In system 100, controller 190 may be charging middle capacitor 140 during a first time period while middle capacitor 142 is delivering current to charge bulk capacitor 150. During a second time period, controller 190 may be charging middle capacitor 142 while middle capacitor 140 is delivering current to charge bulk capacitor 150.

System 100 may include other components not shown in FIG. 1. For example, system 100 may include sensors to measure voltage, current, temperature and other sensors to monitor the operation of system 100. Controller 190 may receive signals from the sensors indicating voltage, current and so on. For example, controller 190 may receive a signal indicating the current through power source 110 at input terminal 112.

Controller 190 may also be configured to detect a fault at the high-side rail or at the low-side rail, e.g., based on signals from one or more sensors. In response to detecting the fault, controller 190 deactivate the switch 130 and switch 132 to isolate high-side rail 162 and low-side rail 164 from power source 110. In other examples, controller 190 may use open loop control mode to pre-charge bulk capacitor 150, and receive a signal indicating a voltage change across bulk capacitor 150. If the voltage is increasing across bulk capacitor 150 while bulk capacitor 150 is receiving power from either middle capacitor 140 or middle capacitor 142, and the voltage change is at an expect voltage change rate, then the circuit is likely operating normally. However, a fault with bulk capacitor 150, or elsewhere in system 100, may cause the voltage change across bulk capacitor 150 to be too fast or too slow. In this manner, controller 190 may detect a fault within system 100.

In some examples, in response to the voltage change satisfying a voltage change threshold, e.g., less than a fast change threshold and/or more than a slow change threshold, controller 190 may switch to a closed loop control mode to pre-charge the bulk capacitor. In other examples, controller 190 may measure a discharge time of the middle capacitor 140 or 142 while charging bulk capacitor 150. Controller 190 may determine whether the discharge time is less than a threshold level. In response to determining that the discharge time is less than the threshold time duration, controller 190 may determine a short circuit condition in bulk capacitor 150. In other examples, controller 190 may measure a discharge time of middle capacitor 140 or 142 and determine an estimated capacitance of bulk capacitor 150 based on the discharge time of middle capacitor 140 or 142.

Other processes for operating an SSPC to avoid a high inrush current may include to apply a pulse width modulated (PWM) drive to the SSPC turn-on process. A PWM drive may be limited to low power and low voltage systems. In other process examples, a SSPC controller may repeatedly allow the SSPC to trip when its instantaneous current trip level has been reached and then be turned on again by sensing a rising output voltage for the SSPC, thereby gradually ramping up the load side voltage. However, this technique may not work if high load current is present. In addition, such a technique may lead to potential excessive switching loss on the SSPC while attempting to charge a large bulk capacitance. In contrast, the techniques of this disclosure, as described above may use a simple alternate switching control scheme, with few components, to control inrush current and maintain isolation to protect against faults.

Other advantages of the techniques of this disclosure may include that the architecture of SSPC may provide bi-directional control of current from differential bus 160 to and from load 170. By alternately controlling the interleaved capacitors to charge and discharge, system 100 may provide decoupled control of energy feeding bulk capacitor 150 as well as provide faster charging, when compared to using a single middle capacitor. In other words, the line may be disconnected when bulk capacitor 150 is charging, which may help prevent severe damage of components due to small energy packets. The architecture and control techniques may solve the potential inrush current caused by direct feeding into an uncharged bulk capacitor (which may also be referred to as a DC link capacitor) in the power converter systems by having the interleaved and decoupled mid-capacitors and slowly charging each middle capacitor with small amount of electrical energy and feeding the energy to the bulk capacitor. The architecture may also allow to detection and measurement of the load bulk capacitance and/or impedance health by measuring the discharge time of the mid capacitor. Periodically measuring the bulk capacitance and estimating the system health may enables development of self-diagnostic and prognostic capability for the SSPC. The SSPC of this disclosure may also detect short circuit or other fault at load 170 during the pre-charge phase without damaging the downstream circuits, such as a converter or other downstream circuitry. By measuring the voltage of the middle capacitors, controller 190 may detect a reverse voltage. In some examples, reverse voltage may be caused by the transient voltage surge at the load side or by the pre-charged load voltage.

Figure 2A:
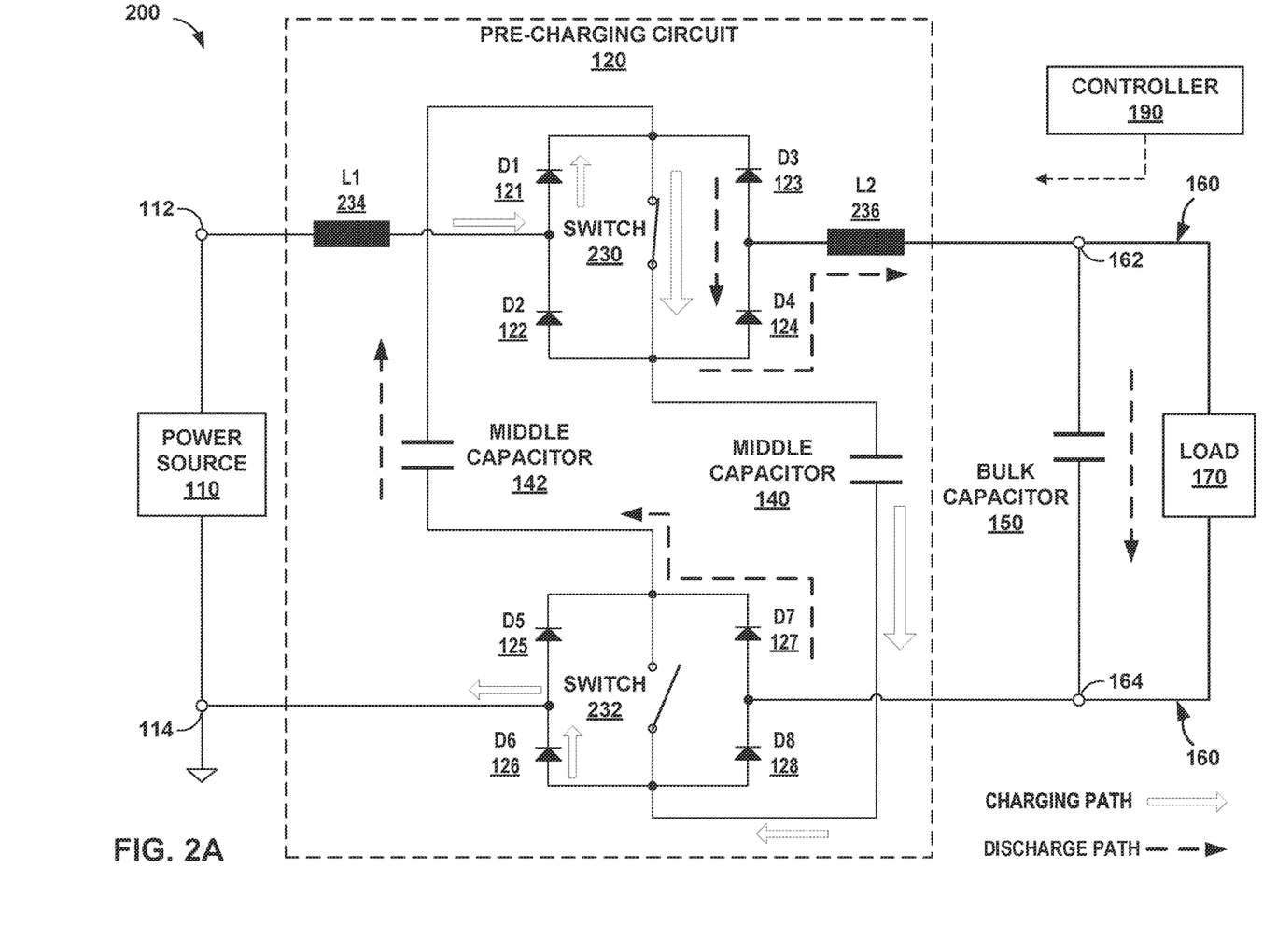
FIGS. 2A and 2B are schematic diagrams showing a forward charging mode, in accordance with one or more techniques of this disclosure.
Figure 2B:
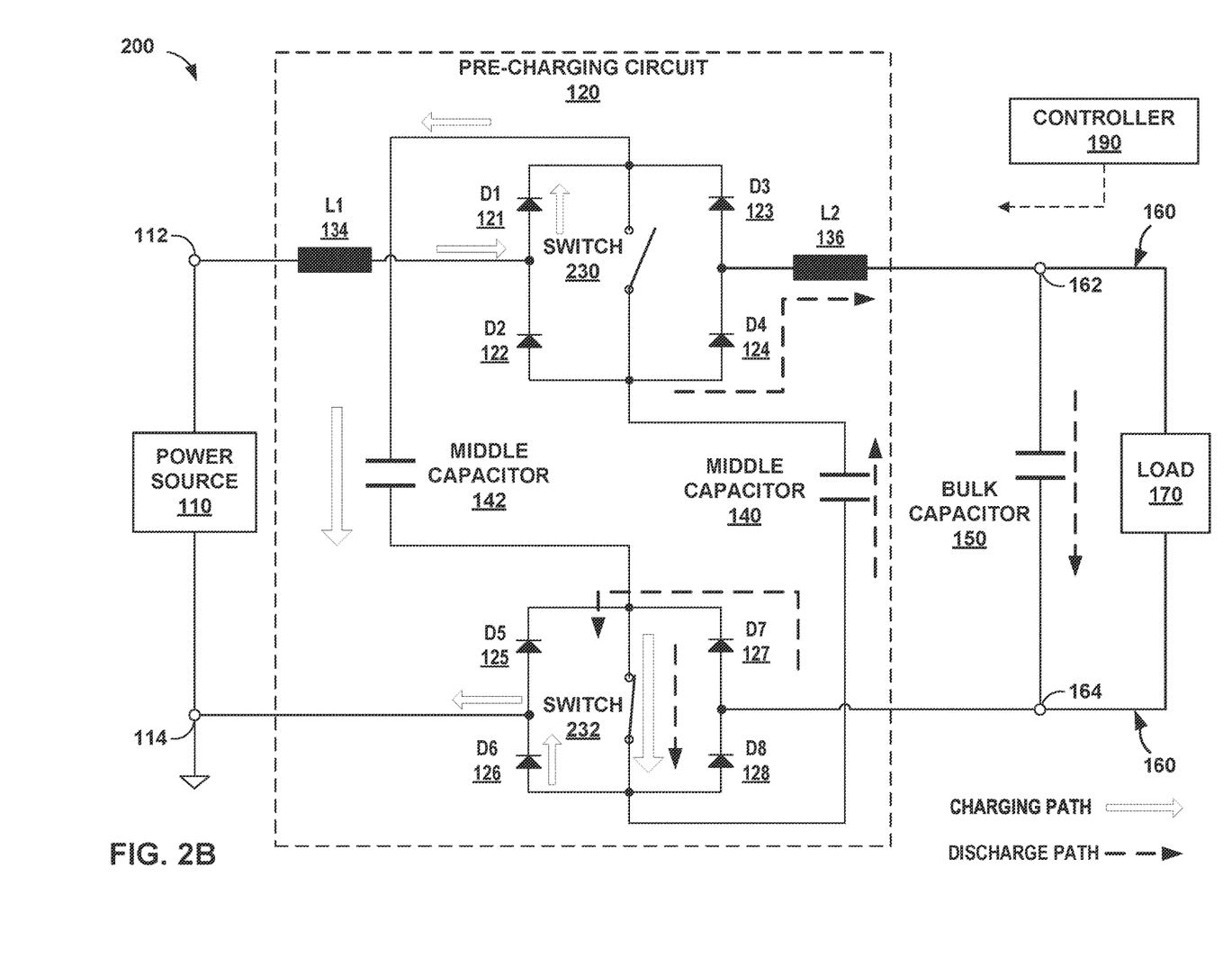

FIGS. 2A and 2B are schematic diagrams showing a forward charging mode, in accordance with one or more techniques of this disclosure. System 200 is an example of system 100 described above in relation to FIG. 1. Items with the same reference numbers have the same functions, connections and characteristics as described above for system 100. In the example of FIG. 2A, the blocks for switches 130 and 132 have been replaced with a closed switch 230 and an open switch 232 to illustrate charging electrical current path of middle capacitor 140 and discharge path for middle capacitor 142.

In other examples, system 200 may operate in reverse charging mode. Because the switch assemblies that include switches 230 and 232 are bidirectional, system 200 may transfer power in the opposite direction, e.g. from high side rail 162 and low side rail 164 to input terminals 112 and 114. Controller 190 may operate switches 230 and 232 to charge a bulk capacitance attached to terminals 112 and 114 (not shown in FIGS. 2A and 2B) in a similar manner to that described below for bulk capacitor 150.

In some examples, the SSPC of this disclosure may include one or more inductive components. In the example of FIGS. 2A and 2B, inductor L1 234 connects between input terminal 112 and the anode of D1 121, as well as the cathode of D2 122. Inductor L2 236, connects the high-side rail 162 and the first terminal of bulk capacitor 150 to the anode of D3 123 and cathode of D4 124. In some examples L1 234 and L2 236 may act as a current chokes to limit current spikes on the high side rail. L1 234 and L2 236 may be implemented as a wound inductor, as a ferrite, or some other type of inductive component.

As described above in relation to FIG. 1, the load capacitor, bulk capacitor 150 in the example of FIG. 2A, is exposed directly to power source 110 in uncharged condition, there may be high magnitude inrush current that passes through the path, which may cause damage to the devices, capacitor etc. If the SSPC of system 200 is turned on and a fault exists, then an even higher magnitude current may flow through the circuitry. In some examples, a range of the inrush current can be 100 times of the nominal current of the device ratings, even without a fault. The inrush current can be reduced by pre-charging the load capacitor before turning on the SSPC devices fully. In FIGS. 1-2B a "fail safe" capacitor, middle capacitor 140 connects between the mid points of the anti-series connected power electronics switches 168 and 166. In some examples, middle capacitor 140 and 142 may be self-healing, non-polarized capacitors, e.g., fail-safe. Using a non-polarized capacitors allows the circuit to be bi-directional.

In operation, when charging middle capacitor 140, switch 232 is open, thereby isolating power source 110 from load 170. The charging current in the example of FIG. 2A may leave input terminal 112, through L1 234, D1 121 and closed switch 230 to charge middle capacitor 140. The charging current path continues to D6 126 back to terminal 114 and power source 110.

While middle capacitor 140 is charging, middle capacitor 142 provides a relatively small amount of electrical energy to bulk capacitor 150. The discharge current from middle capacitor 142 flows through closed switch 230, along with the charging current for middle capacitor 140. The discharging current continues through D4 124, L2 236 to high side rail 162 and into the first terminal for bulk capacitor 150. The discharge current returns through D7 127 to middle capacitor 142.

FIG. 2B is another example of system 200, which is also an example of system 100 described above in relation to FIG. 1. In FIG. 2B, switch 230 is open, or deactivated, and switch 232 is closed or activated. That is, controller 190 may only turn ON the gate driver of switch 132. Activating switch 132 will connect terminal 114 to middle capacitor 142 via switch 132, L1 134, D6 126 and D1 121, which are in the conduction state. In the example in which power source 110 is a DC power source, terminal 112 may be the positive terminal and terminal 114 may be the negative terminal. Therefore, DC power source current would flow through middle capacitor 142 and energy would be stored in middle capacitor 142 according to $0.5*C_2*Vbus^2$, where $C_2$ is the capacitance of middle capacitor 142. Note that during the time period with switch 132 closed and middle capacitor 142 charging, D7 127 and D4 124 also are forward biased and able to conduct but switch 130 is not conducting, therefore, there is no charge flow from middle capacitor 142 to load 170. In this manner, by controller 190 keeping switch 130 at an OFF state prevents middle capacitor 142 from connecting directly to load 170.

During the same time period, stored energy in middle capacitor 140 would discharge to bulk capacitor 150 through switch 132, D4 124, L2 136 and D7 127. In this manner, the inrush current control technique of this disclosure includes storing a small amount of electrical energy in fail-safe middle capacitor 140 at one cycle, then isolate the supply and feed this small energy to charge the load capacitor, e.g. bulk capacitor 150, in the next cycle. Controller 190 continues this process until the load capacitor gets charged to sufficient voltage level, e.g., a predetermined voltage threshold that will avoid a large magnitude inrush current. The architecture of the SSPC circuit of this disclosure includes another fail-safe middle capacitor 142, which charges the load capacitor during the concurrent cycle, e.g., while middle capacitor 140 is charging, and middle capacitor 142 will get charged by power source 110 at the next cycle. In the example of systems 100 and 200, middle capacitors 140 and 142 may have smaller value, e.g. less capacitance than bulk capacitor 150. Those two interleaved fail-safe middle capacitors are working alternatively in the charging mode or discharging mode, which will provide a fast soft-charging performance, e.g., when compared to a single capacitor pre-charge system.

Based on simulation done to verify the fast pre-charging performance with open interleaved middle capacitors on an example 270V DC Bus system, the charging time is reduced by 50%. For example, a 0.15 s charging time for SSPC with two interleaved capacitors and 0.3 s for SSPC with a single middle capacitor, using the same maximum charging current amplitude. The fundamental concept described by this disclosure may apply to all DC voltage ranges from less than 28V to high voltage bus like 540V DC, 750V DC or larger voltage levels. The techniques of this disclosure may be advantageous for high to medium voltage applications where a reduced number of active switches may result in lower component cost. Switches rated for higher voltages may be more costly than switches rated for lower voltage systems, therefore, reducing the number of switches in high voltage systems may be desirable. For example, instead of using four active switches to provide the bi-directional capability, the techniques of this disclosure use only two active switches, with an added benefit of faster charging capability achieved with adding only an additional capacitor.

Figure 3:
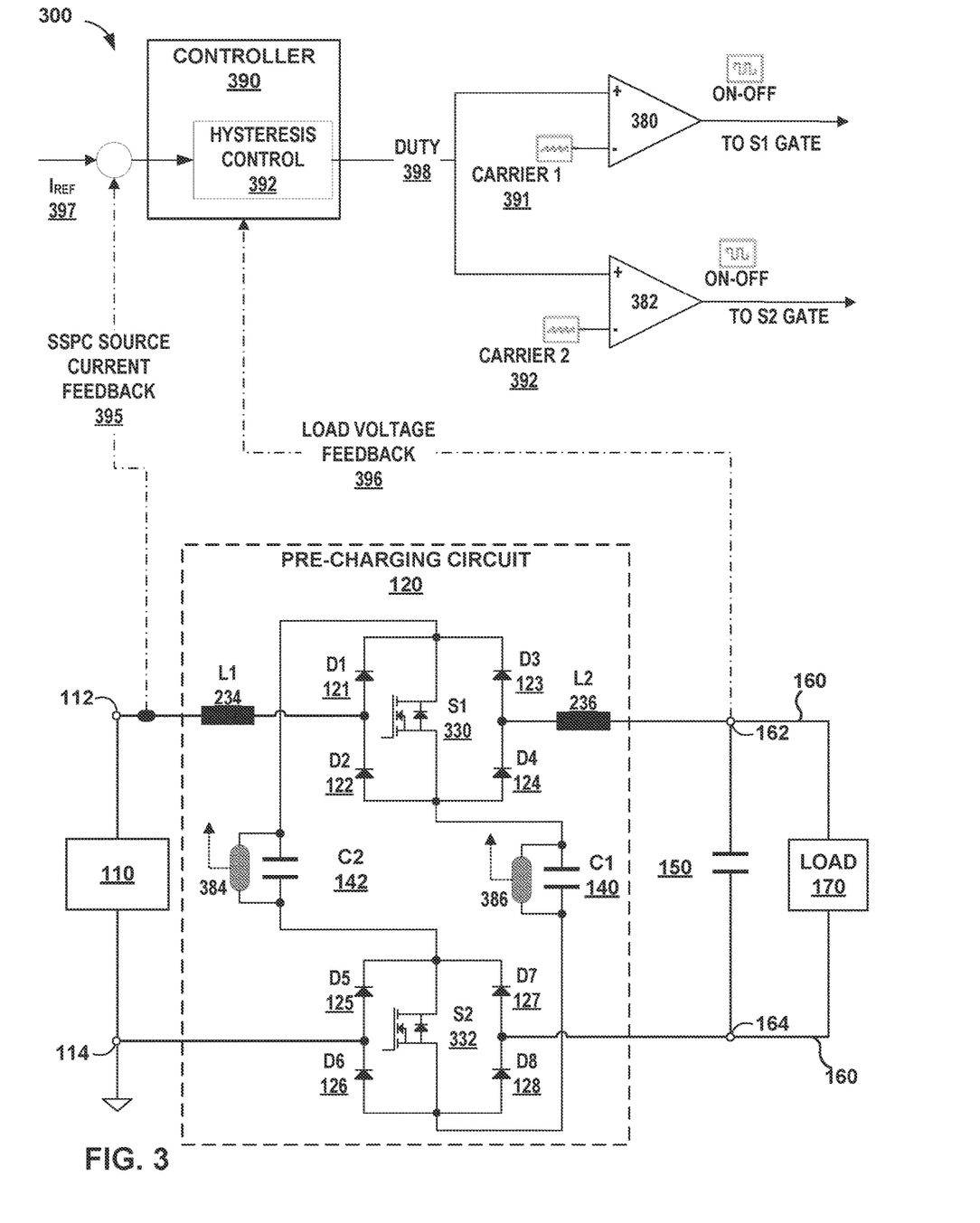
FIG. 3 is a schematic diagram illustrating a power converter implemented using re-channel metal-oxide-semiconductor field-effect transistors with antiparallel diodes, with one example of a closed-loop control mode, in accordance with one or more techniques of this disclosure.

FIG. 3 is a schematic diagram illustrating a power converter implemented using n-channel MOSFETs with anti-parallel body diodes and includes one example of a closed-loop control mode, in accordance with one or more techniques of this disclosure. System 300 is an example of system 100, described above in relation to FIG. 1, and includes additional details of an example of control circuitry to operate an SSPC of this disclosure. Items with the same reference numbers in system 300 as the reference numbers in system 100 have the same functions, connections and characteristics as described above for system 100. In system 300, the blocks indicating switches 130 and 132 in system 100 have been replaced with n-channel MOSFETs 51 330 and S2 332. Also, as described above in relation to FIGS. 2A and 2B, inductor L1 234 connects between input terminal 112 and the anode of D1 121, as well as the cathode of D2 122. Inductor L2 236, connects the high-side rail 162 and the first terminal of bulk capacitor 150 to the anode of D3 123 and cathode of D4 124.

The example of FIG. 3 includes a voltage sensor at differential bus 160 that provides load voltage feedback signal 396 to controller 390. System 300 also includes an electrical current sensor at input terminal 112 that provides source current feedback signal 395 to controller 390. Source current feedback 395 connects to a summing junction along with a reference current Iref 397. Though shown as separate from controller 390 in the example of FIG. 3, in other examples, the summing junction, as well as Iref 397 may be included as circuitry within controller 390.

Controller 390 is an example of controller 190 described above in relation to FIG. 1 and includes similar description, functions and characteristics as described for controller 190. Controller 390 includes hysteresis control circuitry 392, which may output a signal with a duty cycle, such as a pulse modulated signal, indicated by duty 398. Comparators 380 and 382 receive duty 398 at the non-inverting inputs. For comparator 380, a carrier signal generator, carrier 1 391 connects to the inverting input. For comparator 382, a carrier signal generator, carrier 2 392 connects to the inverting input.

In operation, hysteresis control circuitry 392 may provide full controllability of charging current to middle capacitors $C_1$ 140 and $C_2$ 142. Hysteresis control circuitry 392 may be configured to adjust the gate pulse to $S_1$ 330 and $S_2$ 332 based on monitoring charging current, e.g. via source current feedback 395 and monitoring voltages of $C_1$ 140 and $C_2$ 142, e.g. via voltage sensors 384 and 386. There is a phase shift of 180 degrees between carrier 1 391 and carrier 2 392, which may adjust the gate pulse duty cycle output from comparators 380 and 382. In this manner, the closed-loop electrical current hysteresis control of system 300 may control the charging current to the middle capacitors based on source current feedback. Simulation has shown that the charging time for bulk capacitor 150 may be further reduced, e.g. to 0.1 s, using the same amplitude of maximum current when compared to using a constant duty cycle control scheme.

In some examples, based on identified types of loads, system 300 may implement different modes of soft-start methods. For by switching from open-loop pulse control to a closed-loop pulse control selected from several different closed loop control modes, e.g. electrical current hysteresis control or slide mode control. In some examples, applying a gate pulse with larger duty ratio to $S_1$ 330 and $S_2$ 332 may increase the overall charging current to the load side, e.g., to bulk capacitor 150 from interleaved middle capacitors $C_1$ 140 and $C_2$ 142, when compared to a smaller duty ratio gate pulse signal.

Figure 4:
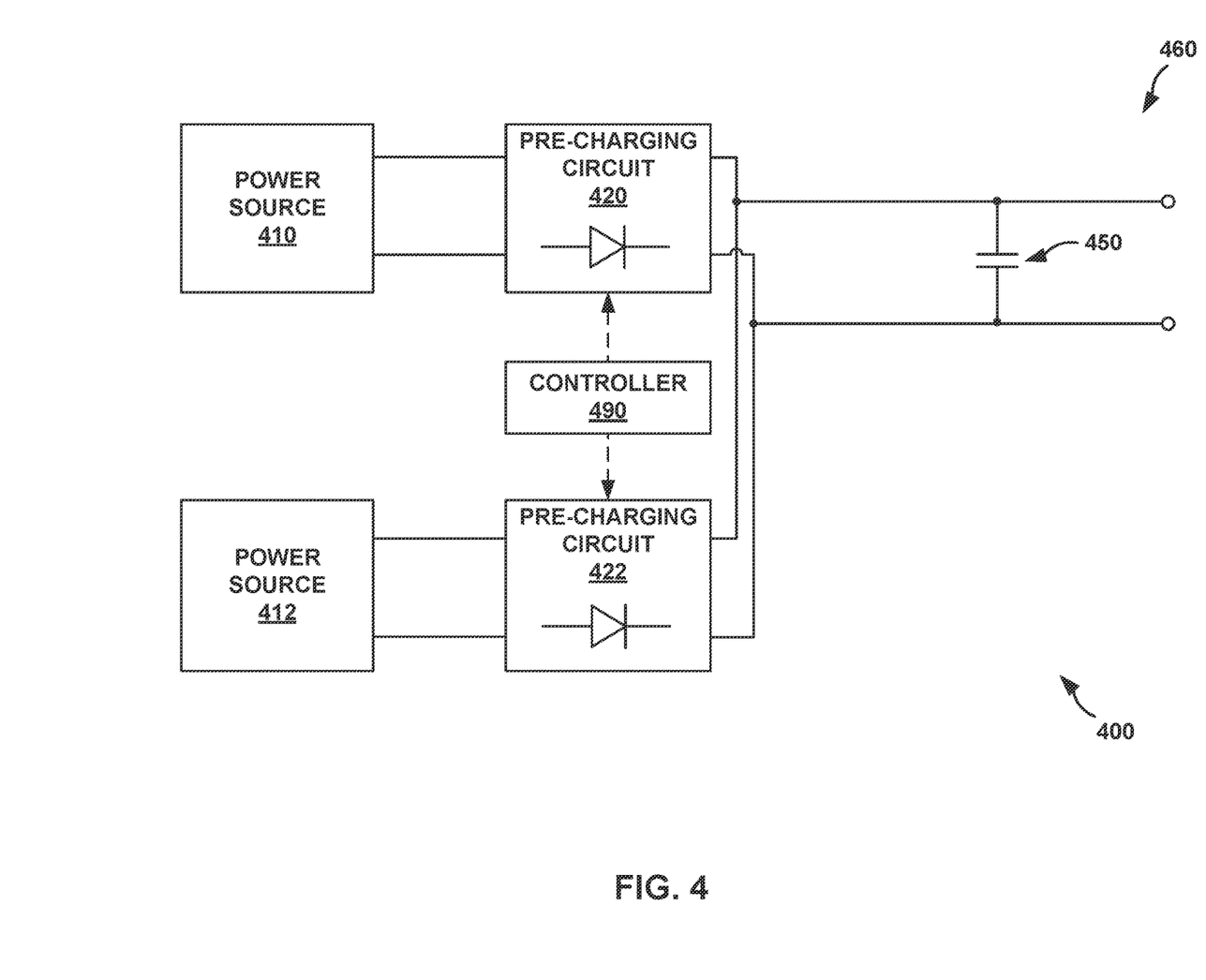
FIG. 4 is a conceptual block diagram showing a circuit arrangement for multiple pre-charging circuits, in accordance with one or more techniques of this disclosure.

FIG. 4 is a conceptual block diagram showing a circuit arrangement for two pre-charging circuits 420 and 422, in accordance with one or more techniques of this disclosure. Electrical power system 400 includes power sources 410 and 412, pre-charging circuits 420 and 422, bulk capacitors 450 and 452, and differential buses 460 and 462. In the example shown in FIG. 4, pre-charging circuit 420 is coupled to power source 410, pre-charging circuit 422 is coupled to power source 412. In some examples, electrical power system 400 includes an electrical load configured to receive power from differential bus 460. In such examples, power sources 410 and 412 may operate as redundant power sources. In the event of a fault at power source 410, controller 490 can deliver power to the electrical load via redundant power source 412.

Power source 410 can generate and deliver power to pre-charging circuit 420, and power source 412 can generate and deliver power to pre-charging circuit 422. Controller 490 can block the flow of power to bulk capacitor 450 by controlling the switches of pre-charging circuits 420 and 422. In examples in which controller 490 deactivates the switches of pre-charging circuit 420, bulk capacitor 450 may not receive power from power source 410. In examples in which controller 490 deactivates the switches of pre-charging circuit 422, bulk capacitor 450 may not receive power from power source 412.

Controller 490 can perform dynamic load management without a separate OR-ing device. One example of an OR-ing device is a diode that protects a system against an input power source fault condition. Electrical power system 400 may not include an OR-ing device to prevent the undesired flow of power between power sources 410 and 412. The structure of pre-charging circuits 420 and 422 removes the need for an OR-ing device due to the configuration of the switches of pre-charging circuits 420 and 422. In some examples, the antiparallel diodes of pre-charging circuits 420 and 422 prevent the undesired flow of power from bulk capacitor 450 back to power sources 410 and 412. In examples in which power source 410 fails, controller 490 can deactivate the switches of pre-charging circuit 420 to prevent power sharing between power sources 410 and 412.

A diode OR-ing device (not shown in FIG. 4) may allow current to flow in one direction only, thus isolating a fault on a differential bus from the redundant differential bus, allowing the electrical power system to run off the remaining redundant power source. Pre-charging circuit 420 and 422 can provide the same functionality as an OR-ing device, such that controller 490 can isolate a fault on differential bus 460 from differential bus 462.

Figure 5:
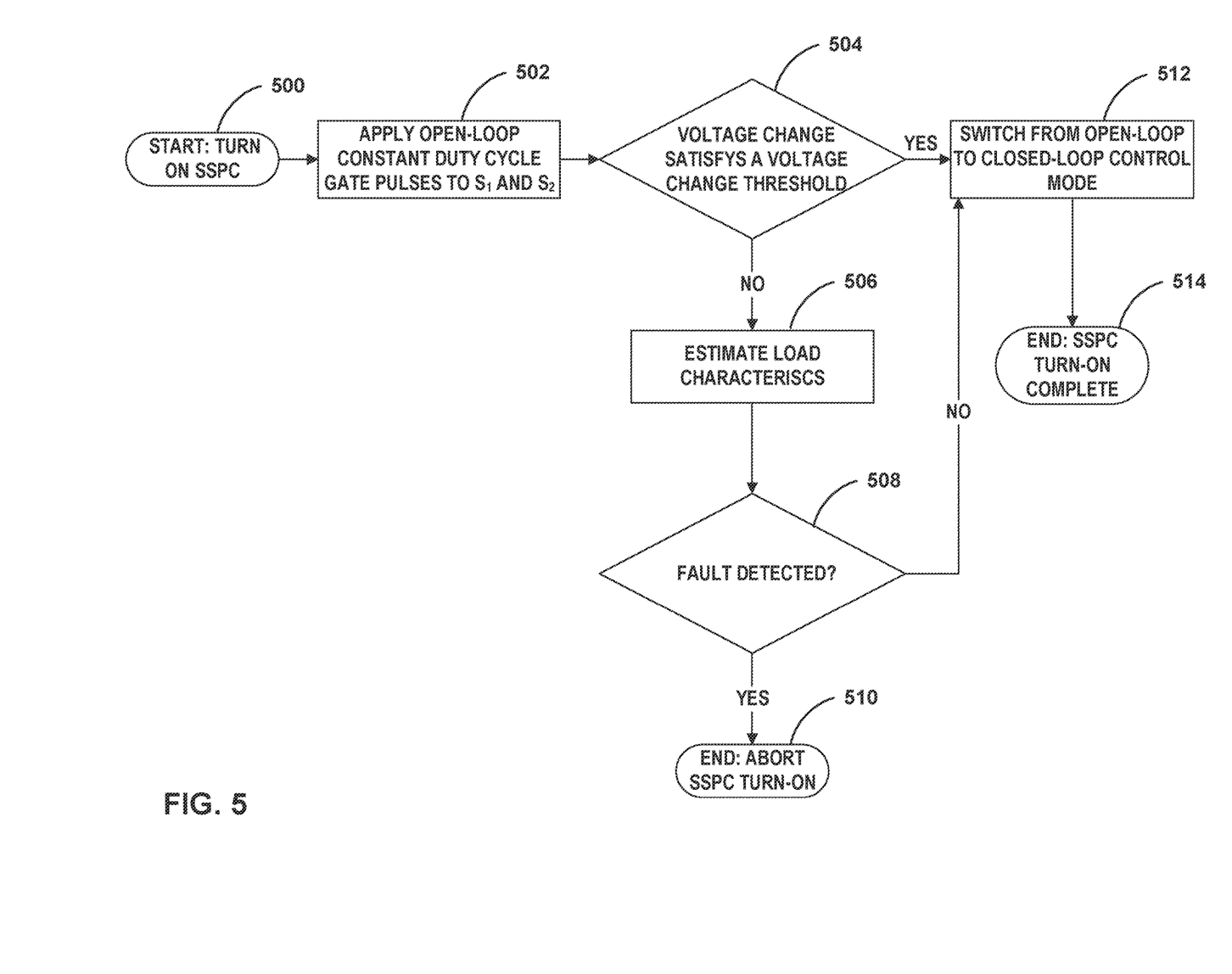
FIG. 5 is a flow chart illustrating an example start-up operation for power converter circuit, according to one or more techniques of this disclosure.

FIG. 5 is a flow chart illustrating an example start-up operation for power converter circuit, according to one or more techniques of this disclosure. The blocks of FIG. 5 will be described in terms of FIG. 1, unless otherwise noted.

In the example of FIG. 5, to start up the SSPC of system 100 (500), controller 190 may pre-charge bulk capacitor 150 using open loop control at a first time. For example, controller 190 may apply a constant duty cycle pulse to the control terminals of switches 130 and 132 (502). In the example in which switches 130 and 132 are MOSFETs, the control terminals may be the gate of the MOSFET. In some examples, the open-loop pulse control may be a small duty ratio, applied to switches 130 and 132, e.g. less than fifty percent, to initially to check whether the load voltage rises as expected.

Controller 190 may monitor a voltage change across bulk capacitor 150, e.g. via a voltage sensor located across bulk capacitor 150 (not shown in FIG. 1). Controller 190 may compare the charging rate of bulk capacitor 150, e.g. a voltage change, to a threshold. In response to the voltage change failing to satisfy a voltage change threshold (NO branch of 504), controller 190 may perform further testing of one or more characteristics of load 170. In this disclosure, to "satisfy a threshold" indicates that a value is above a minimum threshold, below a maximum threshold, or within a desired threshold range.

In some examples, controller 190 may estimate one or more load characteristics, such as a measurement of the load bulk capacitance and/or impedance health by measuring the discharge time of either or both of middle capacitors 140 and 142. In other examples, in response to determining that the discharge time is less than the threshold time duration, controller 190 may determine that a short circuit condition exists in bulk capacitor 150, or elsewhere in load 170. Determining the load characteristics may also identify the type of loads, e.g., capacitive, resistive, and so on, which may impact which type of closed loop control that controller 190 may be configured to select.

In response to detecting a fault (YES branch of 508), controller 190 may abort start up of the SSPC (510). If controller 190 does not detect a fault, (NO branch of 508), controller 190 may switch to a closed-loop control mode (512). Similarly, in response to the voltage change satisfying a voltage change threshold (YES branch of 504), controller 190 may pre-charge bulk capacitor 150 using a closed loop control mode at a second time subsequent to the first time (512).

Figure 6:
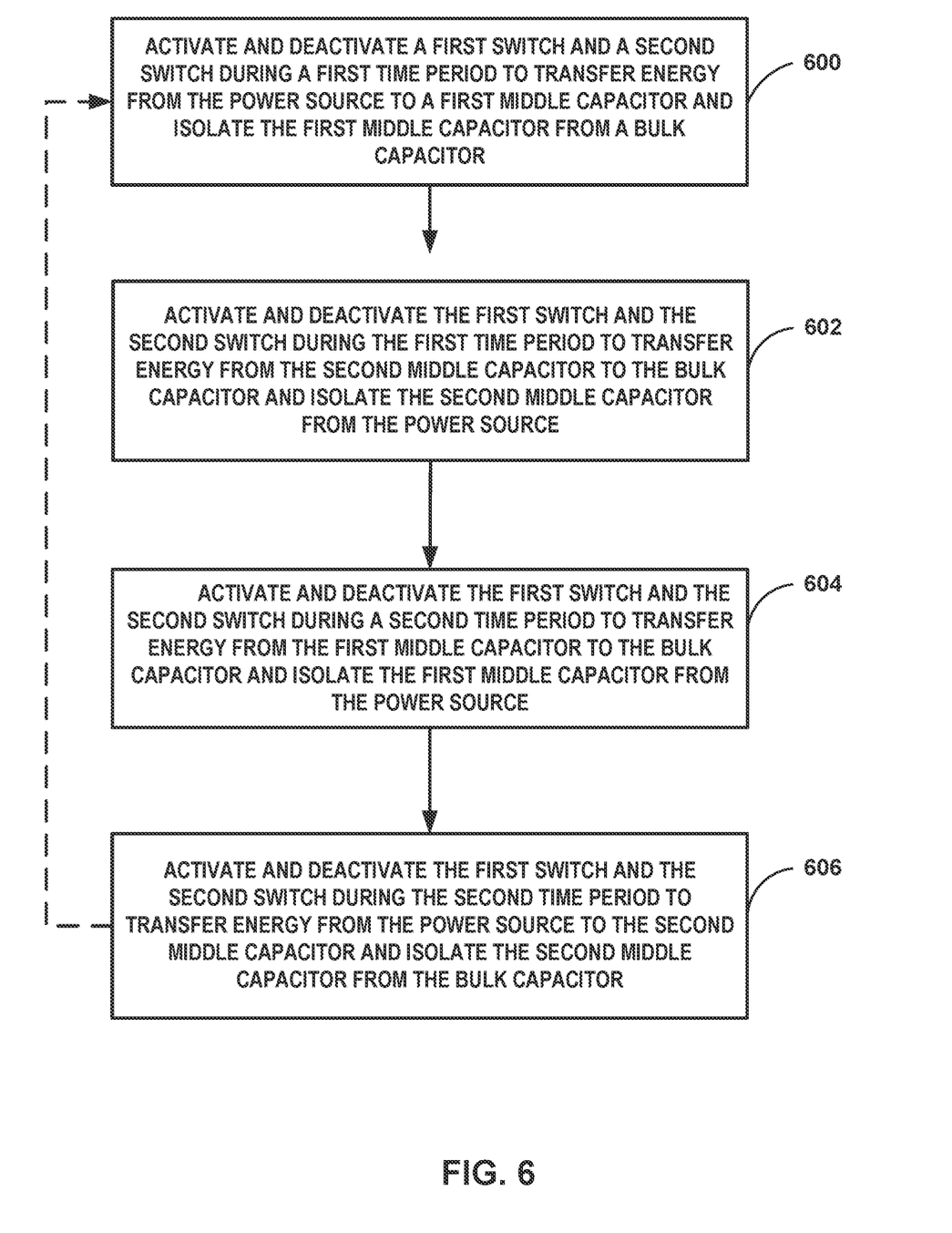
FIG. 6 is a flow chart illustrating an example operation of a pre-charging circuit according to one or more techniques of this disclosure.

FIG. 6 is a flow chart illustrating an example operation of a pre-charging circuit according to one or more techniques of this disclosure. The blocks of FIG. 6 will be described in terms of FIGS. 2A and 2B, unless otherwise noted.

Controller 190 may activate and deactivate switches 230 and 232 during a first time period to transfer energy from power source 110 to middle capacitor 140 and isolate middle capacitor 140 from bulk capacitor 150 and load 170 (600). Specifically, controller 190 may send gate signals to switch 230 to activate and conduct current and to switch 232 to deactivate and block current flow. As described above in relation to FIGS. 1-4, closing switch 230 while switch 232 is open charges middle capacitor 140. By activating and deactivating switches 230 and 232 during the first time period, e.g., switch 230 is closed and switch 232 is open, also causes pre-charging circuitry 120 to transfer energy from middle capacitor 242 to bulk capacitor 150 and isolate middle capacitor 242 from power source 110 (602).

During a second time period, controller 190 may activate and deactivate switches 230 and 232 to transfer energy from power source 110 to middle capacitor 242 and isolate middle capacitor 242 from bulk capacitor 150 as well as from load 170 and any other downstream components (604). Specifically, controller 190 may send signals to the control terminal of switch 232 to activate and conduct current and to the control terminal of switch 230 to deactivate and block current flow. By activating and deactivating the first switch and the second switch during a second time period to transfer energy from the first middle capacitor to the bulk capacitor and isolate the first middle capacitor the power source (606).

Various examples of the disclosure have been described. These and other examples are within the scope of the following claims.

What is claimed is:

1. A circuit comprising:
    a differential bus including a high-side rail and a low-side rail;
    a bulk capacitor coupled between the high-side rail and the low-side rail, the bulk capacitor configured to filter power output by the circuit; and
    a pre-charging circuit configured to pre-charge the bulk capacitor, the pre-charging circuit comprising:
        a first switch and a second switch;
        a first middle capacitor and a second middle capacitor;
        wherein a drain terminal of the first switch is directly coupled to a first terminal of the second middle capacitor and a source terminal of the first switch is directly coupled to a first terminal of the first capacitor;
        wherein a drain terminal of the second switch is directly coupled to a second terminal of the second capacitor and the source terminal of the second switch is directly coupled to a second terminal of the first capacitor.

2. The circuit of claim 1,
    wherein the pre-charging circuit is configured to pre-charge the bulk capacitor prior to connecting a power source to a load, and
    wherein the pre-charging circuit is configured to connect and disconnect the high-side rail and the low-side rail while pre-charging the bulk capacitor.

3. The circuit of claim 1, further comprising a power source configured to generate power and is coupled to the pre-charging circuit; wherein the pre-charging circuit further comprises a plurality of diodes, wherein:
    an anode of a first diode and a cathode of a second diode of the plurality of diodes connect to a first terminal of the power source;
    an anode of a third diode and a cathode of a fourth diode connect to the high-side rail;
    an anode of a fifth diode and a cathode of a sixth diode connect to a second terminal of the power source;
    an anode of a seventh diode and a cathode of an eighth diode connect to the low-side rail.

4. The circuit of claim 3, further comprising a controller configured to operate the pre-charging circuit to:
    activate and deactivate the first switch and the second switch during a first time period to transfer energy from the power source to the first middle capacitor and isolate the first middle capacitor from the bulk capacitor; and
    activate and deactivate the first switch and the second switch during a second time period to transfer energy from the first middle capacitor to the bulk capacitor and isolate the first middle capacitor from the power source.

5. The circuit of claim 4, wherein the controller is configured to operate the pre-charging circuit to:
    activate and deactivate the first switch and the second switch during the second time period to transfer energy from the power source to the second middle capacitor and isolate the second middle capacitor from the bulk capacitor; and
    activate and deactivate the first switch and the second switch during the first time period to transfer energy from the second middle capacitor to the bulk capacitor and isolate the second middle capacitor from the power source.

6. The circuit of claim 1, further comprising a controller configured to:
    pre-charge the bulk capacitor using open loop control at a first time;
    monitor a voltage change across the bulk capacitor;
    in response to the voltage change satisfying a voltage change threshold, pre-charge the bulk capacitor using a closed loop control mode at a second time subsequent to the first time.

7. The circuit of claim 6,
    wherein the circuit is configured to supply power to a load,
    wherein the controller is configured to:
        determine a type of the load,
        select the closed loop control mode from a plurality of closed loop control modes based on the type of the load,
        pre-charge the bulk capacitor using the selected closed loop control mode.

8. The circuit of claim 7, wherein the selected control mode comprises an electrical current hysteresis control mode.

9. The circuit of claim 7, wherein the load comprises an inverter configured to convert the power filtered by the bulk capacitor.

10. The circuit of claim 1, further comprising a controller configured to:
    measure a discharge time of the first middle capacitor;
    determine whether the discharge time is less than a threshold time duration; and
    determine a short circuit condition in the bulk capacitor in response to determining that the discharge time is less than the threshold time duration.

11. The circuit of claim 1, further comprising:
    a power source configured to generate electrical power and is coupled to the pre-charging circuit;
    controller configured to:
        detect a fault at the high-side rail or at the low-side rail; and
        in response to detecting the fault, deactivate the first switch and the second switch to isolate the high-side rail and the low-side rail from the power source.

12. The circuit of claim 11, wherein the power source is a direct current (DC) power source.

13. The circuit of claim 11, wherein the circuit is bi-directional in which the power source supplies power to a load at a first time and receives power from the load at a second time.

14. The circuit of claim 1, wherein the first middle capacitor and the second middle capacitor comprise a self-healing, non-polarized capacitor.

15. A method for controlling a pre-charging circuit coupled between a power source and a differential bus, the method comprising:
    activating and deactivating, by a controller, a first switch and a second switch during a first time period to transfer energy from the power source to a first middle capacitor and isolate the first middle capacitor from a bulk capacitor, wherein:
        the pre-charging circuit comprises the first switch and the second switch,
        the differential bus comprises a high-side rail and a low-side rail, and
        the bulk capacitor is coupled between the high-side rail and the low-side rail;
    activating and deactivating the first switch and the second switch during a second time period to transfer energy from the first middle capacitor to the bulk capacitor and isolate the first middle capacitor from the power source;
    activating and deactivating the first switch and the second switch during the second time period to transfer energy from the power source to a second middle capacitor and isolate the second middle capacitor from the bulk capacitor; and
    activating and deactivating the first switch and the second switch during the first time period to transfer energy from the second middle capacitor to the bulk capacitor and isolate the second middle capacitor from the power source.

16. The method of claim 15, further comprising:
    using, by the controller, open loop control to pre-charge the bulk capacitor at a first time;
    while using open loop control to pre-charge the bulk capacitor, receiving a signal indicating a voltage change across the bulk capacitor;
    in response to the voltage change satisfying a voltage change threshold, using, by the controller, a closed loop control mode at a second time subsequent to the first time to pre-charge the bulk capacitor.

17. The method of claim 15, further comprising
    detecting whether a fault exists at the high-side rail or at the low-side rail; and
    in response to detecting the fault, deactivate the first switch and the second switch to isolate the high-side rail and the low-side rail from the power source.

18. A device comprising a non-transitory computer-readable storage medium having executable instructions stored thereon, configured to be executable by processing circuitry for causing the processing circuitry to:
    activate and deactivate a first switch and a second switch during a first time period to transfer energy from a power source to a first middle capacitor and isolate the first middle capacitor from a bulk capacitor, wherein the bulk capacitor is coupled between a high-side rail and the low-side rail of a differential bus;
    activate and deactivate the first switch and the second switch during a second time period to transfer energy from the first middle capacitor to the bulk capacitor and isolate the first middle capacitor from the power source;
    activate and deactivate the first switch and the second switch during the second time period to transfer energy from the power source to a second middle capacitor and isolate the second middle capacitor from the bulk capacitor; and
    activate and deactivate the first switch and the second switch during the first time period to transfer energy from the second middle capacitor to the bulk capacitor and isolate the second middle capacitor from the power source.

19. The device of claim 18, wherein the instructions are configured to cause the processing circuitry to:
    use open loop control to pre-charge the bulk capacitor at a first time;
    while using open loop control to pre-charge the bulk capacitor, receive a signal indicating a voltage change across the bulk capacitor;
    in response to the voltage change satisfying a voltage change threshold, use a closed loop control mode at a second time subsequent to the first time to pre-charge the bulk capacitor.

20. The device of claim 18,
    wherein the electrical power converter is configured to supply power to a load, and
    wherein the instructions are configured to cause the processing circuitry to:
        determine a type of the load,
        select the closed loop control mode from a plurality of closed loop control modes based on the type of the load, and
        pre-charge the bulk capacitor using the selected closed loop control mode.

\* \* \* \* \*